United States Patent
Huang et al.

(10) Patent No.: US 11,399,520 B2
(45) Date of Patent: Aug. 2, 2022

(54) SYSTEM AND METHOD FOR SMART AQUACULTURE

(71) Applicant: NATIONAL SUN YAT-SEN UNIVERSITY, Kaohsiung (TW)

(72) Inventors: Ing-Jer Huang, Kaohsiung (TW); Chin-Chang Hung, Kaohsiung (TW); Yun-Nan Chang, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 422 days.

(21) Appl. No.: 16/589,156

(22) Filed: Oct. 1, 2019

(65) Prior Publication Data
US 2021/0045364 A1    Feb. 18, 2021

(30) Foreign Application Priority Data

Aug. 12, 2019 (TW) .................. 108128627

(51) Int. Cl.
*A01K 61/00* (2017.01)
*A01K 61/85* (2017.01)
*G06T 7/11* (2017.01)
*A01K 63/04* (2006.01)

(52) U.S. Cl.
CPC .............. *A01K 61/85* (2017.01); *G06T 7/11* (2017.01); *A01K 63/047* (2013.01)

(58) Field of Classification Search
CPC ...... A01K 61/85; A01K 61/80; A01K 63/047; A01K 61/042; G06T 7/11
See application file for complete search history.

(56) References Cited

U.S. PATENT DOCUMENTS

| | | | |
|---|---|---|---|
| 5,732,655 A | 3/1998 | Baba et al. | |
| 9,622,492 B2 | 4/2017 | Ledet et al. | |

FOREIGN PATENT DOCUMENTS

| | | | | |
|---|---|---|---|---|
| CN | 106818610 A | | 6/2017 | |
| CN | 107094683 A | * | 8/2017 | ............ G01N 33/18 |
| KR | 101891654 B1 | * | 8/2018 | ............ G06M 7/04 |
| TW | M286581 U | | 2/2006 | |
| TW | M515276 U | | 1/2016 | |
| TW | M518879 U | | 3/2016 | |
| TW | I574612 B | | 3/2017 | |
| TW | M578511 U | | 6/2019 | |
| TW | M587896 U | | 12/2019 | |
| WO | WO-2020046523 A1 | * | 3/2020 | ............ A01K 61/60 |
| WO | WO-2020250330 A1 | * | 12/2020 | ............ A01K 61/59 |

OTHER PUBLICATIONS

Machine translation of CN 106818610 A to Univ Guangdong Ocean, published Jun. 13, 2017, foreign patent document cited on Oct. 1, 2019 IDS.*
Ing-Jer Huang et al., "The Prototype of a Smart Underwater Surveillance System for Shrimp Farming," 2018 IEEE International Conference on Advanced Manufacturing, Nov. 16, 2018.

\* cited by examiner

*Primary Examiner* — Kathleen I Alker
(74) *Attorney, Agent, or Firm* — CKC & Partners Co., LLC

(57) ABSTRACT

A smart aquaculture method is provided for an aquaculture system including a breeding pool, a feeding machine and a camera disposed in the breeding pool. The method includes: taking an underwater image by the camera; calculating a feed remaining amount according to the underwater image; and controlling the feeding machine according to the feed remaining amount to dispense feed to the breeding pool.

6 Claims, 4 Drawing Sheets

SYSTEM AND METHOD FOR SMART AQUACULTURE

RELATED APPLICATIONS

This application claims priority to Taiwan Application Serial Number 108128627, filed Aug. 12, 2019, which is herein incorporated by reference.

BACKGROUND

Field of Invention

The present invention relates to a smart aquaculture system which is capable of dispensing feed automatically.

Description of Related Art

In the current aquaculture technology, although feeding equipments have been available, they have simple functions such as start-up, shutdown, and flow control. Conventional feeding equipments still rely on personnels or timers to start, stop, or regulate the flow of feed. In this situation, the biggest challenge is to maintain the quality of the water in the breeding pool. The growth of shrimp depends on the amount and timing of the feed, but turbid water makes it difficult to observe the status of the shrimps. If feed is insufficient, the growth of the shrimp is limited. On the other hand, if the shrimps are overfed, excessive feed residual will accumulate in the water, which will worsen the water quality. In addition, poor water quality produces bacteria which will make the shrimps sick. It is concerned by people in the art about how to dispense the feed automatically in a more intelligent way.

SUMMARY

Embodiments of the invention provide a smart aquaculture system including a breeding pool, a feeding machine, a camera disposed in the breeding pool for capturing an underwater image, and a controller communicatively connected to the camera and the feeding machine for obtaining the underwater image. The controller is configured to calculate a feed remaining amount according to the underwater image or transmit the underwater image to a server which calculates the feed remaining amount. The controller is configured to control the feeding machine according to the feed remaining amount to dispense feed to the breeding pool.

In some embodiments, the smart aquaculture system further includes a stand disposed in the breeding pool. The camera is disposed on the stand, and the feeding machine is configured to dispense at least a portion of the feed into the stand.

In some embodiments, the stand includes a mesh plane and a collection tray. A shooting direction of the camera is toward the mesh plane. The collection tray extends outward from the mesh plane.

In some embodiments, the stand further includes a support portion disposed under the mesh plane such that the mesh plane is spaced from a bottom of the breeding pool by a distance.

In some embodiments, the smart aquaculture system further includes a washing machine configured to spew water or bubbles to the stand. The controller is configured to perform an image segmentation algorithm to the underwater image to obtain a stand image region, and determine whether to activate the washing machine according to the area of the stand image region.

In some embodiments, the controller is configured to perform an image segmentation algorithm to the underwater image to obtain a feed image region, and determine whether the area of the feed image region is smaller than a threshold. The controller is configured to control the feeding machine to dispense the feed to the breeding pool when the area of the feed image region is smaller than the threshold.

In some embodiments, the shooting end of the camera is flat or convex.

From another aspect, embodiments of the invention provide a smart aquaculture method for an aquaculture system including a breeding pool, a feeding machine, and a camera disposed in the breeding pool. The smart aquaculture method includes: capturing, by the camera, an underwater image; calculating a feed remaining amount according to the underwater image; and controlling the feeding machine according to the feed remaining amount to dispense feed to the breeding pool.

In some embodiments, the aquaculture system further includes a washing machine configured to spew water or bubbles to a stand. The smart aquaculture method further includes: performing an image segmentation algorithm to the underwater image to obtain a stand image region; and determining whether to activate the washing machine according to the area of the stand image region.

In some embodiments, the smart aquaculture method further includes: performing an image segmentation algorithm to the underwater image to obtain a feed image region; determining whether the area of the feed image region is smaller than a threshold; and controlling the feeding machine to dispense the feed to the breeding pool if the area of the feed image region is smaller than the threshold.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
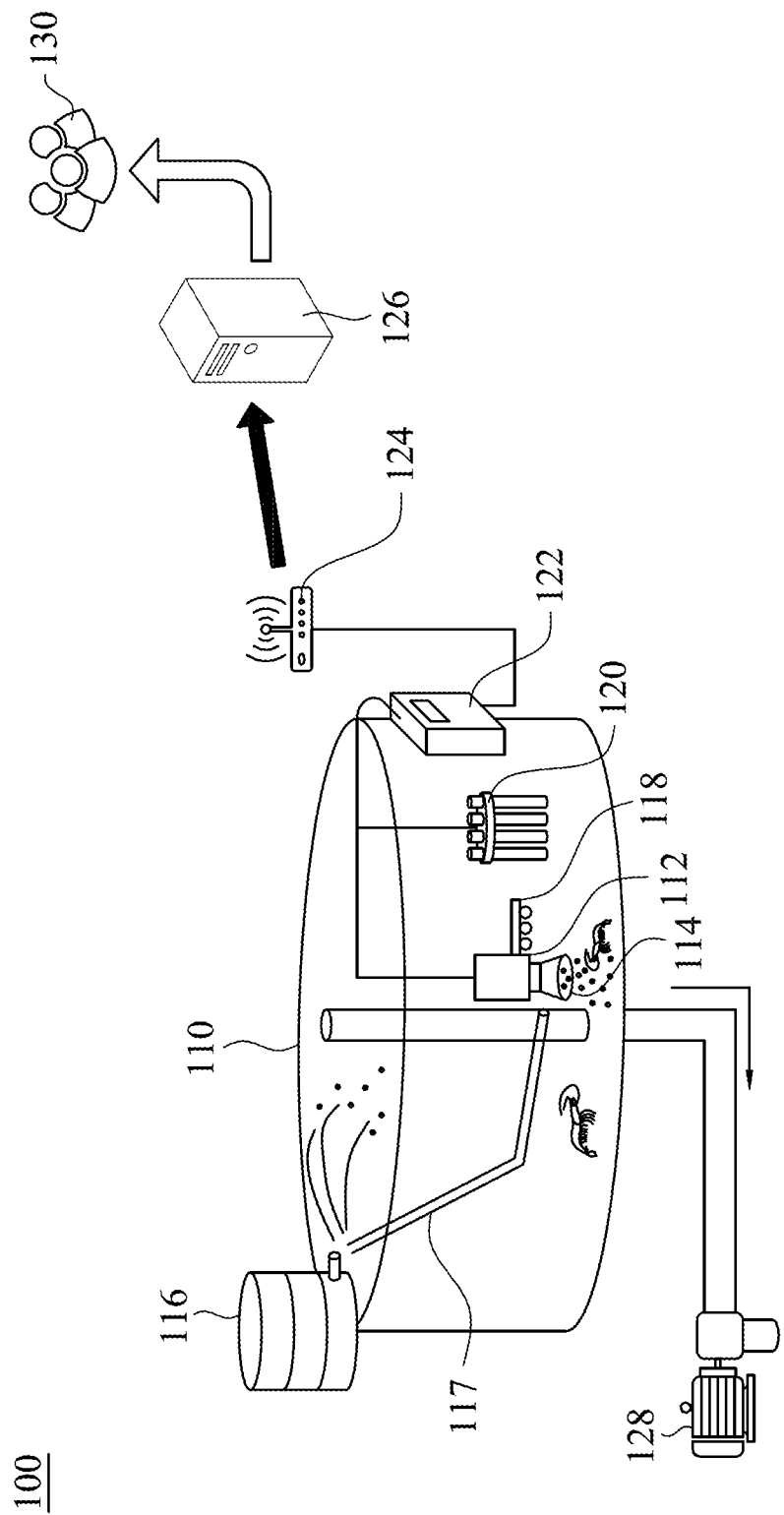
FIG. 1 is a schematic diagram illustrating a smart aquaculture system in accordance with an embodiment.

FIG. 1 is a schematic diagram illustrating a smart aquaculture system in accordance with an embodiment. Referring to FIG. 1 a smart aquaculture system 100 includes a breeding pool 110, a camera 112, a stand 114, a feeding machine 116, a feeding tube 117, lighting devices 118, water quality sensors 120, a controller 122, a router 124, a server 126, and a sewage pump 128.

Shrimps are bred in the breeding pool 110 whose shape is circular in the embodiment. However, in other embodiment, the breeding pool 110 may have any other shapes such as a rectangle, and any other aquatic creatures such as fish, crabs, etc. may be bred in the breeding pool 110, which is not limited in the invention. The sewage pump 128 is configured to pump water from the bottom of the breeding pool 110 to drain sewage. The feeding machine 116 may include a motor or any other suitable equipment for dispensing feed to the stand 114 through the feeding tube 117. In some embodiments, the feeding machine 116 may have other openings to directly dispense the feed to the breeding pool 110.

The camera 112 is disposed underwater in the breeding pool 110 for capturing underwater images. The camera 112 may include charge-coupled device (CCD) sensors, complementary metal-oxide semiconductor (CMOS) sensors or other suitable optical sensors for sensing visible light or invisible light which is not limited in the invention. In some embodiments, the camera 112 has an infrared sensor and a visible light sensor for respectively capturing infrared images and visible light images. In some embodiments, the camera 112 may include multiple visible light sensors, and a three-dimensional field of view is generated according to the captured images. The lighting devices 118 may include one or more light emitting diodes (LED), and the wavelengths of the LEDs are not limited in the invention. The router 124 may be a wired router or a wireless router.

The water quality sensors 120 are configured to sense dissolved oxygen, temperature, or any other data related to water quality. The controller 122 is communicatively connected to the water quality sensor 120, the camera 112, the feeding machine 116, and the sewage pump 128. The means for "communicatively connected" may be wired communication or wireless communication such as the Internet, local area networks (LANs), wide area networks (WANs), near field communications (NFC), infrared (IR), Bluetooth, WiFi, etc. for transmitting signals and data between devices. The controller 122 may be a central processing unit, a microprocessor, a microcontroller, a digital signal processor, an image processing chip, an application-specific integrated circuit, etc. The controller 122 obtains the underwater images from the camera 112 and collects data from the water quality sensors 120. The collected data and images may be transmitted to the server 126 through the router 124 so that a user 130 may access the data and the images from the server 126.

Figure 2:
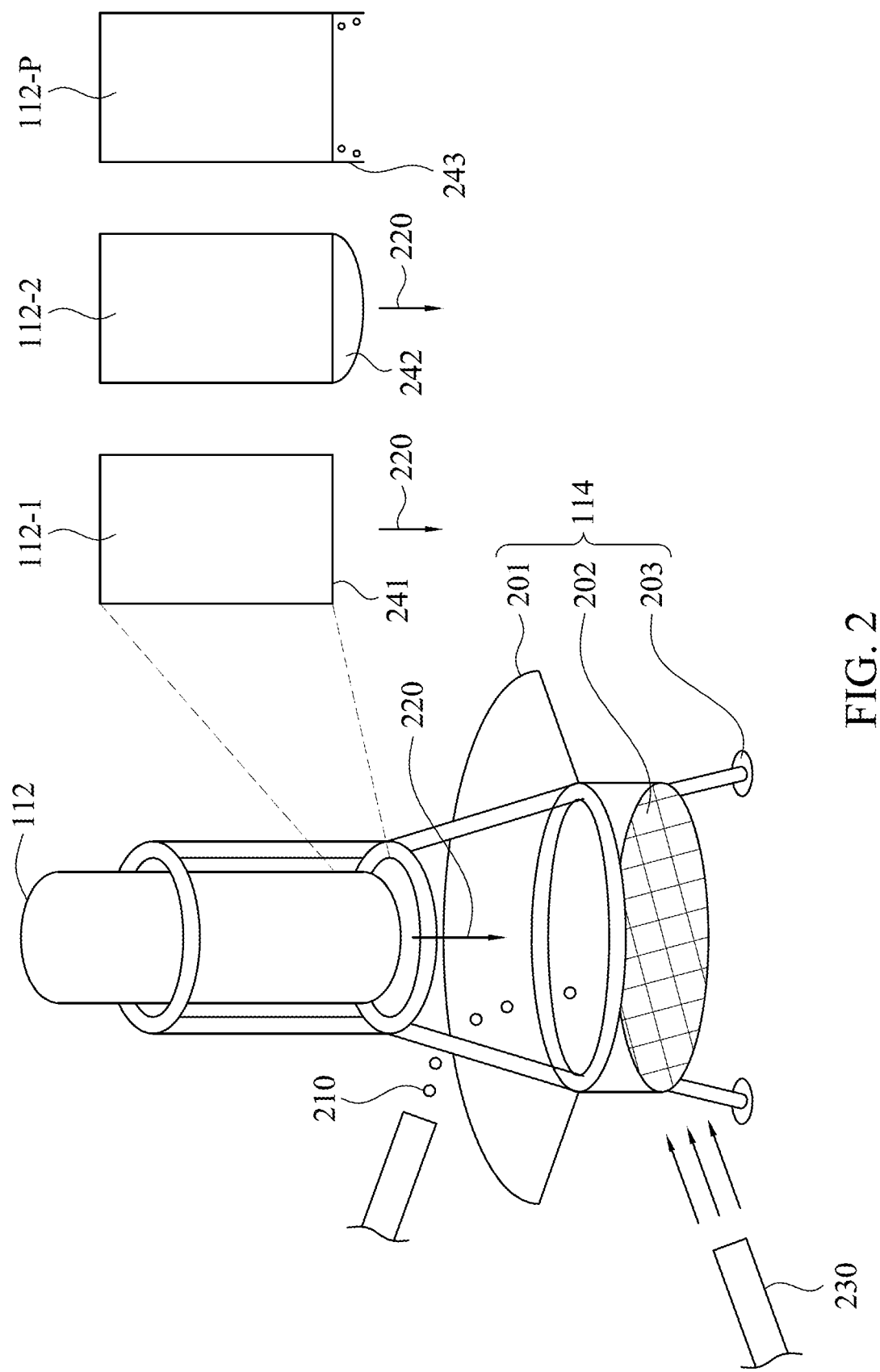
FIG. 2 is a schematic diagram illustrating a camera disposed on a stand in accordance with an embodiment.

FIG. 2 is a schematic diagram illustrating a camera disposed on a stand in accordance with an embodiment. In the embodiment of FIG. 2, the stand 114 has a mesh plane 202, a collection tray 201 and a support portion 203 that may be formed of metal or any suitable material. The feed 210 is dispensed onto the mesh plane 202. The feed 210 may flow to outside of the mesh plane 202 because the water flow in the breeding pool 110 can be large. Therefore, the collection tray 201 extends outward from the mesh plane 202 to catch the feed 210. The collection tray 201 is not completely shown in FIG. 2 for the sake of simplicity. In some embodiments, the angle of the collection tray 201 may be 360 degrees to catch the feed as many as possible. The camera 112 may be disposed on an upper part of the stand 114, and a shooting direction 220 of the camera 112 is toward the mesh plane 202. That is, the main content in the aforementioned underwater images would be the mesh plane 202 and the feed thereon. In addition, the water at the bottom of the breeding pool 110 is usually turbid, and hence the support portion 203 is disposed under the mesh plane 202 such that the mesh plane 202 is spaced from the bottom of the breeding pool 110 by a distance so that clear underwater images are captured. However, FIG. 2 is merely an example, and people in the art should be able to modify the shape and size of the stand 114 based on the disclosure.

FIG. 2 also shows an enlarged schematic view of shooting ends of the cameras 112-1, 112-2, and 112-$p$. The shooting end 241 is flat in an embodiment, and the shooting end 242 is convex in another embodiment. Lens or protective covers may be disposed at the shooting ends 241 and 242 that are not limited in the invention. The shooting end 243 used in the prior art has a spacer extending outward from the shooting end 243 (i.e. the shooting end 243 is concave), and therefore bubbles would stay at the shooting end 243 and affect the captured images. In contrast, bubbles are not formed at the shooting ends 241 and 242.

Referring to FIG. 1 and FIG. 2, after the underwater images are captured, a feed remaining amount is calculated according to the underwater image, and the feeding machine 116 is controlled according to the feed remaining amount to dispense feed to the breeding pool 110. For example, when the feed remaining amount is greater than a threshold, the controller 122 controls the feeding machine 116 not to dispense the feed. When the feed remaining amount is less than the threshold, the controller 122 controls the feeding machine 116 to dispense the feed. As a result, the feed is dispensed only when it is needed, and thus reducing the waste of the feed. The calculation of the feed remaining amount may be done by the controller 122, or the controller 122 may transmit the underwater images to the server 126 which calculates the feed remaining amount remotely and transmits the result back to the controller 122. Embodiments will be provided to describe the calculation of the feed remaining amount.

Figure 3:
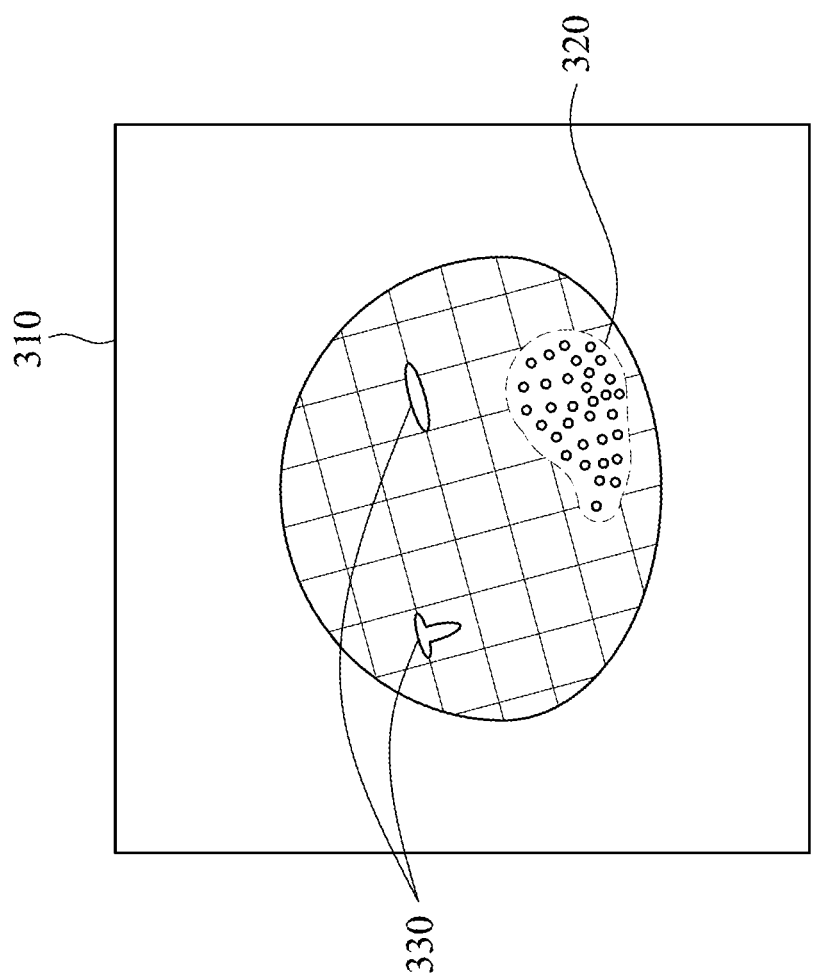
FIG. 3 is a schematic diagram of an underwater image in accordance with an embodiment.

A machine learning approach is used to calculate feed remaining amount in the embodiment. That is, the underwater image(s) is input to a machine learning model which will output a number representing the feed remaining amount. The machine learning model may be a convolutional neural network, a support vector machine or any other suitable model, which is not limited in the invention. In some embodiments, the machine learning model is used to perform an image segmentation algorithm for segmenting at least one feed image region from the underwater image. For example, as shown in FIG. 3, a feed image region 320 is extracted from an underwater image 310. In some embodiments, the underwater image 310 is an infrared image in which the feed is clearly shown, but the underwater image 310 may be a visible light image in other embodiments, which is not limited in the invention. Take the convolutional neural network as an example, in the training phase, the captured underwater images are input to the convolutional neural network, and the output of the convolutional neural network is set to be manually segmented binary images (indicating which pixels are feed, and which pixels are not); in the test phase, the underwater images captured online are input to the trained convolutional neural network which would output a segmented binary image. The area of the feed image region 320 is positively correlated to the feed remaining amount. When the area of the feed image region 320 is smaller than a threshold, it means that the feed is not enough, and therefore the feeding machine 116 is controlled to dispense the feed to the breeding pool 110. In some embodiments, the weight of the feed is measured for training the machine learning model, and thus the output value in the test phase is a predicted weight of the feed. In some embodiments, the volume or the number of the feed is used to train the machine learning model. In other words, the aforementioned feed remaining amount may be weight, volume, or number of the feed, or the area of the feed image region 320, which is not limited in the invention.

Referring to FIG. 2 and FIG. 3, the washing machine 230 is configured to spew water or bubbles to clean the stand 114. The washing machine 230 may include a motor, a compressor or any other suitable equipment. The machine learning approach is also used herein to determine the timing of cleaning. To be specific, an image segmentation algorithm is performed to the underwater image to obtain a stand image region which indicates the region corresponding to the stand 114. In the training phase, the stand 114 in the underwater images is labeled manually as the output of the convolutional neural network. When the stand 114 has dirt 330 covering the mesh plane, the area of the visible stand image region decreases. When the area of the visible stand image region is smaller than a threshold, it means the stand 114 has too much dirt, and therefore the controller 122 would activate the washing machine 230 to clean the stand 114.

In some embodiments, a mesh plane region in the underwater image is merged with background images of other breeding pools to produce training images for adapting to a variety of breeding pools, resulting in a robust convolutional neural network. For example, the mesh plane region is segmented manually, and this mesh plane region is pasted into a background image of another breeding pool. The boundary between the mesh plane region and the background image can be processed by a Poisson equation. Accordingly, additional training underwater images are produced without disposing the mesh plane in that breeding pool.

In some embodiments, the controller 122 or the server 126 may perform a defogging algorithm to the underwater image. The defogging algorithm may be, for example, a convolutional neural network. In the training phase, the input of the convolutional neural network is a blurred underwater image, and the output is a clear underwater image. In the test phase, a clear underwater image is output, and an object detection algorithm may be performed to the clear underwater image to detect aquatic creatures/plants. In some embodiments, the defogged underwater image is transmitted to server 126.

Figure 4:
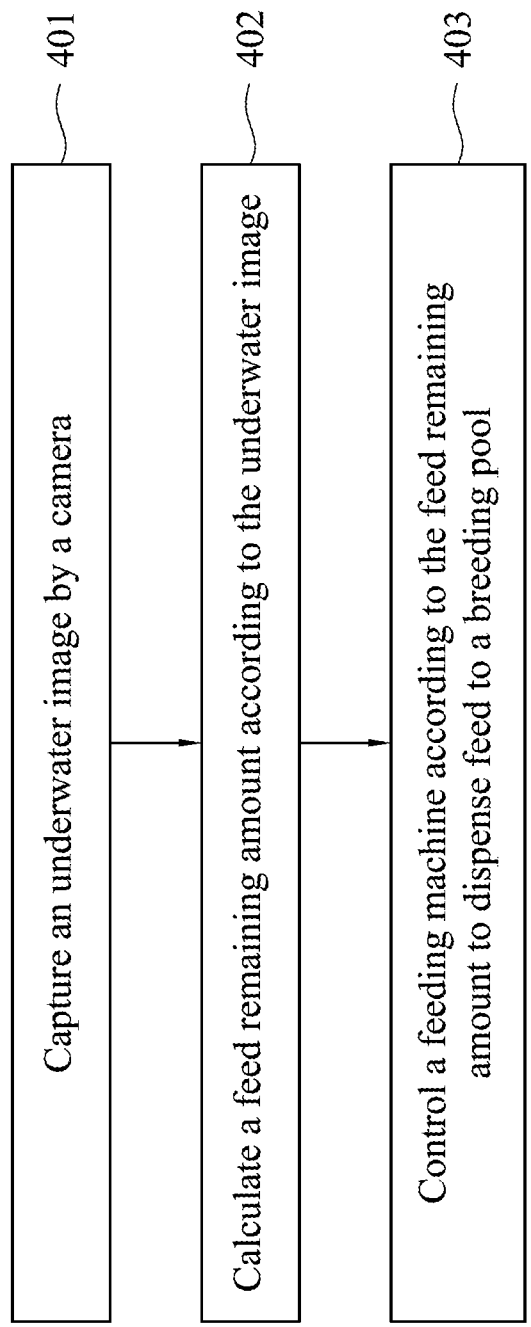
FIG. 4 is a flow chart of a smart aquaculture method in accordance with an embodiment.

FIG. 4 is a flow chart of a smart aquaculture method in accordance with an embodiment. Referring to FIG. 4, in step 401, an underwater image is captured by a camera. In step 402, a feed remaining amount is calculated according to the underwater image. In step 403, a feeding machine is controlled according to the feed remaining amount to dispense feed to a breeding pool. However, each step of FIG. 4 has been described above, and therefore the description will not be repeated. Note that each step of FIG. 4 can be implemented as program codes or circuit, which is not limited in the invention. Moreover, the method of FIG. 4 may be performed with the aforementioned embodiments or independently. In other words, other steps may be inserted between the steps of FIG. 4.

In the aforementioned smart aquaculture system and method, the amount of the dispensed feed is controlled by an image processing technology, and thus the waste of the feed is reduced. In addition, the camera is disposed on the stand, and the captured underwater images are mainly related to the mesh plane and the feed, such that the method may be applied to other breeding pools and is less sensitive to the background of the breeding pool.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A smart aquaculture system comprising:
   a breeding pool;
   a feeding machine;
   a camera disposed in the breeding pool for capturing an underwater image, wherein a shooting end of the camera is convex;
   a stand disposed in the breeding pool, wherein the camera is disposed on the stand; and
   a controller communicatively connected to the camera and the feeding machine for obtaining the underwater image,
   wherein the controller is configured to perform an image segmentation algorithm to the underwater image to obtain a feed image region, and determine whether an area of the feed image region is smaller than a first threshold,
   wherein the controller is configured to control the feeding machine to dispense feed to the stand when the area of the feed image region is smaller than the first threshold.

2. The smart aquaculture system of claim 1, wherein the stand comprises a mesh plane and a collection tray, a shooting direction of the camera is toward the mesh plane, and the collection tray extends outward from the mesh plane.

3. The smart aquaculture system of claim 2, wherein the stand further comprises a support portion disposed under the mesh plane such that the mesh plane is spaced from a bottom of the breeding pool by a distance.

4. The smart aquaculture system of claim 1, further comprising a washing machine configured to spew water or bubbles to the stand,
   wherein the controller is configured to perform the image segmentation algorithm to the underwater image to obtain a stand image region, and activate the washing machine when an area of the stand image region is smaller than a second threshold.

5. A smart aquaculture method for an aquaculture system comprising a breeding pool, a feeding machine, a stand disposed in the breeding pool, and a camera, wherein the camera is disposed in the breeding pool, and the smart aquaculture method comprises:
   capturing, by the camera, an underwater image, wherein a shooting end of the camera is convex;
   performing an image segmentation algorithm to the underwater image to obtain a feed image region and a stand image region; and
   controlling the feeding machine to dispense feed to the stand when an area of the feed image region is smaller than a first threshold.

6. The smart aquaculture method of claim 5, wherein the aquaculture system further comprises a washing machine configured to spew water or bubbles to a stand, and the smart aquaculture method further comprises:
- performing the image segmentation algorithm to the underwater image to obtain a stand image region; and
- activating the washing machine when an area of the stand image region is smaller than a second threshold.

* * * * *